United States Patent
Ide et al.

(10) Patent No.: US 7,096,770 B2
(45) Date of Patent: Aug. 29, 2006

(54) OPTICAL RECORDING MEDIUM-MANUFACTURING APPARATUS

(75) Inventors: Junichi Ide, Tokyo (JP); Haruhiko Yamaguchi, Tokyo (JP); Takeshi Umega, Tokyo (JP); Futoshi Kobayashi, Tokyo (JP); Tsuyoshi Itoh, Tokyo (JP); Yoshimi Yodogawa, Tokyo (JP); Mamoru Usami, Tokyo (JP)

(73) Assignee: TDK Corporation, Tokyo (JP)

( * ) Notice: Subject to any disclaimer, the term of this patent is extended or adjusted under 35 U.S.C. 154(b) by 159 days.

(21) Appl. No.: 10/762,305

(22) Filed: Jan. 23, 2004

(65) Prior Publication Data

US 2004/0149111 A1    Aug. 5, 2004

(30) Foreign Application Priority Data

Jan. 23, 2003    (JP) .............................. 2003-014353

(51) Int. Cl.
*B26D 5/08* (2006.01)
*B26D 7/01* (2006.01)
*G11B 7/26* (2006.01)

(52) U.S. Cl. ............................. 83/682; 83/681; 83/701; 83/862; 414/222.13; 425/142; 425/291; 425/810

(58) Field of Classification Search .................... 83/51, 83/701, 621, 681, 682, 862, 863, 7; 264/1.33, 264/154, 155; 425/810, 291, 142, 289; 720/718; 414/222.13, 222.07, 222.12; 29/603.16, 29/432, 34 R; 118/500
See application file for complete search history.

(56) References Cited

U.S. PATENT DOCUMENTS 3,338,199 A * 8/1967 William ........................ 413/13

FOREIGN PATENT DOCUMENTS

| JP | 58-175630 | * 4/1982 | .................. 83/701 |
| JP | 58-175630 | * 10/1983 | |
| JP | 10-40584 | 2/1998 | |
| JP | 10-249264 | 9/1998 | |

(Continued)

OTHER PUBLICATIONS

English Language Abstract of JP 2004-39149.

(Continued)

*Primary Examiner*—Boyer D. Ashley
*Assistant Examiner*—Edward Landrum
(74) *Attorney, Agent, or Firm*—Greenblum & Bernstein, P.L.C.

(57) ABSTRACT

There is provided an optical recording medium-manufacturing apparatus that is capable of accurately transferring a disk-shaped apparatus during a manufacturing process, and at the same time occupies a small installation area. A control section causes a cut-forming machine installed at a cut-forming location to form a cut in a resin layer of a disk-shaped substrate, then causes an indexing mechanism to rotate a transfer stage to thereby transfer the disk-shaped substrate formed with the cut to a central hole-forming location, and then causes a punching machine to punch a central hole.

8 Claims, 9 Drawing Sheets

U.S. PATENT DOCUMENTS

| | | | |
|---|---|---|---|
| 3,728,062 A * | 4/1973 | Layman | 425/291 |
| 3,970,023 A * | 7/1976 | Herbst et al. | 72/325 |
| 4,379,686 A * | 4/1983 | Chambers et al. | 425/290 |
| 4,581,188 A * | 4/1986 | Westerman, Jr. | 264/107 |
| 5,232,505 A * | 8/1993 | Novak et al. | 118/712 |
| 5,612,068 A * | 3/1997 | Kempf et al. | 425/574 |
| 5,863,170 A * | 1/1999 | Boitnott et al. | 414/222.13 |
| 5,913,652 A * | 6/1999 | Zejda | 414/226.01 |
| 6,312,519 B1 * | 11/2001 | Perego | 118/66 |
| 6,843,622 B1 * | 1/2005 | DeMint et al. | 409/138 |
| 2004/0061247 A1 | 4/2004 | Koyama | |

FOREIGN PATENT DOCUMENTS

| | | |
|---|---|---|
| JP | 2003-59124 | 2/2003 |
| JP | 2004-39149 | 2/2004 |

OTHER PUBLICATIONS

English Language Abstract of JP 2003-59124.
English Language Abstract of JP 10-40584.
English Language Abstract of JP 10-249264.

* cited by examiner

OPTICAL RECORDING MEDIUM-MANUFACTURING APPARATUS

BACKGROUND OF THE INVENTION

1. Field of the Invention

The present invention relates to an optical recording medium-manufacturing apparatus for manufacturing an optical recording medium by punching a central hole through a disk-shaped substrate having a resin layer formed on one side thereof.

2. Description of the Related Art

In general, when an optical recording medium (optical disk), such as a CD or a DVD, is manufactured, a thin film, such as a light-reflecting layer, is formed on a disk-shaped substrate having grooves and lands formed in a surface thereof by injection molding, and then a resin layer as a protective layer is formed on the thin film by the spin-coating method such that the protective layer covers the thin film. Further, when a writable optical recording medium, such as a CD-R, a CD-RW, a DVD-R, or a DVD-RW, is manufactured, thin films, such as a light-reflecting layer and a recording layer, are sequentially formed on a surface of a substrate, and then a resin layer as a protective layer is formed on top of the thin films by the spin-coating method such that the protective layer covers the thin films. If the optical recording medium thus manufactured has variation in the film thickness of the resin layer thereof, it is difficult to reliably prevent damage from occurring to the thin film. Therefore, in the formation of a resin layer, it is necessary to spin-coat the entire surface of a substrate with a resin material for forming a resin layer, to a uniform thickness. Further, to form a resin layer having a uniform thickness on a substrate by the spin-coating method, it is preferable to drop a resin material onto the center of a substrate being rotated. However, it is necessary to form a central hole in the center of an optical recording medium, for enabling clamping (chucking) e.g. by a recording and reproducing apparatus, which makes it difficult to drop a resin material onto the center of a substrate during execution of spin-coating operation. To overcome this problem, the present inventors have proposed in Japanese Patent Application No. 2002-196415 an optical recording medium-manufacturing apparatus (hereinafter also referred to as the "manufacturing apparatus") which is configured to drop a resin material onto a substrate before forming a central hole, thereby forming a resin layer with a uniform thickness, and then punch the central hole such that the central hole extends through the substrate and the resin layer.

In the proposed manufacturing apparatus, first, an information-recording surface of a disk-shaped substrate (substrate) having no central hole formed in a central portion thereof is spin-coated with a resin for forming a light transmission layer. In this case, differently from the CD and the DVD of the type referred to hereinabove, an optical recording medium manufactured by the manufacturing apparatus proposed by the present inventors is configured such that in recording or reproducing record data, a laser beam is caused to enter the medium from a front surface side of a resin layer formed on a thin film. Therefore, in the manufacturing apparatus, when the optical recording medium is manufactured, a light transmission layer for transmitting a laser beam therethrough is formed in place of the protective layer in the above example. More specifically, an ultraviolet-curing resin, for example, is dropped onto the center (portion to be formed with a central hole afterwards) of a substrate being rotated by a coating device such that the resin material is caused to expand toward the periphery of the substrate by centrifugal force generated by rotation of the substrate. In doing this, the rotational speed of the substrate is properly adjusted, whereby the resin material is uniformly coated on the entire information-recording surface. Then, an ultraviolet ray is irradiated onto the resin coated on the substrate such that the resin is cured to form a light transmission layer.

Then, a circular cut having a diameter approximately equal to that of the central hole is formed in the light transmission layer in an area of the light transmission layer where a central hole is to be formed. More specifically, the substrate is rotated in a state where a blade of a tool is pushed into the light transmission layer, whereby a cut having a depth approximately equal to the thickness of the light transmission layer is formed in the light transmission layer. Subsequently, the substrate is transferred by a transfer mechanism from a processing location for forming a cut (hereinafter also referred to as the "cut-forming location") to a location for forming a central hole (hereinafter also referred to as the "central hole-forming location"). Then, a hollow cylindrical punching tool is pushed into the substrate from the side where the light transmission layer has been formed, to thereby punch a central hole through the substrate. In doing this, since the cut has been formed in the light transmission layer prior to punching the central hole, peeling-off or formation of burrs is prevented from occurring to the light transmission layer during formation of the central hole. By carrying out the steps described above, the optical recording medium is completed. Thereafter, the optical recording medium is transferred by the transfer mechanism from the central hole-forming location to a stack location for stacking completed optical recording media.

However, from the study of the proposed manufacturing apparatus, the present inventors found out the following points for improvement: In the proposed manufacturing apparatus, a substrate having a cut formed therein is transferred from the cut-forming location to the central hole-forming location by the transfer mechanism. In this case, the transfer mechanism employed for this type of manufacturing apparatus includes pivot arms each having a sucking portion mounted at a foremost end thereof for sucking a substrate (optical recording medium) thereto, and is capable of transferring the substrate held thereat by suction along an arcuate path of the sucking portion at the foremost end of the pivot arm rotated about the root (proximal) end thereof. Further, a cut-forming machine for forming a cut and a punching machine for punching the disk-shaped substrate are provided with vertical movement mechanisms for vertically moving a tool for forming a cut and a punching tool, respectively. This requires the transfer mechanism to be arranged such that the transfer mechanism does not interfere with the vertical motions of these tools, which makes it difficult to arrange the transfer mechanism very close to the cut-forming machine and the punching machine. Accordingly, it is necessary to install the transfer mechanism at a location away from the cut-forming machine and the punching machine, and transfer substrates by its long pivot arms. As a consequence, it is necessary to secure a large pivotal motion space which allows the pivot arms and substrates held thereat to move. This makes it preferable to make the area occupied by the whole manufacturing apparatus as small as possible. Further, in the case of the transfer mechanism employing the pivot arms, it is difficult to accurately control the pivoting angle of each pivot arm, and the start and stop of suction of a substrate by the sucking portion of the pivot arm, and hence there is also a problem of difficulty to perform accurate transfer of a substrate from the cut-forming location (where the cut-forming machine is installed) to the central hole-forming location (where the central hole-forming machine is installed).

Further, in the manufacturing apparatuses proposed by the inventors, when the punching of a central hole by the punching machine is completed, very small cuttings sometimes remain adhering to the central hole or its vicinity, and hence it is necessary to remove the cuttings. Further, in the case of the manufacturing apparatus proposed by the present inventors, when a tool pushed into the light transmission layer on a substrate in forming a cut, or a punching tool pushed into the substrate in punching a central hole, is moved away from the substrate, the substrate with the tool or the punching tool stuck therein is sometimes moved together with the tool. In such a case, the efficiency in manufacturing optical recording media is degraded since an operator has to remove the substrate from the tool by manual operation, and hence improvement in this point is desired.

SUMMARY OF THE INVENTION

The present invention has been made to solve the above described problems, and a first object thereof is to provide an optical recording medium-manufacturing apparatus that is capable of accurately transferring a disk-shaped apparatus during a manufacturing process, and at the same time occupies a small installation area. It is a second of the invention to provide an optical recording medium-manufacturing machine that is capable of realizing at least one of removable of cuttings produced by punching, and prevention of movement of a substrate when a tool is removed from the substrate.

To attain the above object, there is provided an optical recording medium-manufacturing apparatus for manufacturing an optical recording medium by forming a central hole that extends through a disk-shaped substrate and a resin layer formed on one side of the disk-shaped substrate, the optical recording medium-manufacturing apparatus comprising a cut-forming machine installed at a first processing location and having a cut-forming blade section that forms a circular cut in the resin layer such that the circular cut has a diameter larger than a diameter of the central hole and surrounds a portion of the resin layer where the circular cut is to be formed, a punching machine installed at a second processing location and having a punching blade section that is pushed into a portion of the disk-shaped substrate where the central hole is to be formed, from the other side of the disk-shaped substrate, to thereby punch the central hole, a transfer mechanism that transfers the disk-shaped substrate for which the formation of the cut has been completed from the first processing location to the second processing location, the transfer mechanism having a transfer stage that supports the disk-shaped substrate, and an indexing device that transfers the disk-shaped substrate on the transfer stage from the first processing location to the second processing location, and a control section that controls respective operations of the cut-forming machine, the punching machine, and the transfer mechanism, the control section causing the cut-forming machine to form the cut in the resin layer, then causing the indexing device of the transfer mechanism to transfer the disk-shaped substrate for which the formation of the cut has been completed from the first processing location to the second processing location, and then causing the punching machine to punch the central hole through the disk-shaped substrate for which the formation of the cut has been completed.

With the arrangement of this optical recording medium-manufacturing apparatus, the control section causes the cut-forming machine to form a cut, then causes the indexing device of the transfer mechanism to rotate the transfer stage to thereby transfer the disk-shaped substrate to the second processing location, and then causes the punching machine to punch the central hole. Compared with a general transfer mechanism which necessitates long pivot arms, it is possible to reduce the area occupied by the whole optical recording medium-manufacturing apparatus. Further, according to the transfer mechanism of this optical recording medium-manufacturing apparatus, differently from the transfer mechanism that transfers a disk-shaped substrate from the first processing location to the second processing location, using a pivot arm, it is possible to transfer the disk-shaped substrate only by rotating the transfer stage, which makes it possible to perform accurate transfer of the disk-shaped substrate without dropping off the same during the transfer, or setting the disk-shaped substrate in the punching machine in an inclined state.

Preferably, the optical recording medium-manufacturing apparatus comprises a cleaner that is installed at a third processing location, for cleaning the central hole and its vicinity by executing at least one of blowing of a gas toward a rim of the central hole of the disk-shaped substrate for which the formation of the central hole has been completed and suction of air in the vicinity of the rim of the central hole, and the control section causes the transfer mechanism to transfer the disk-shaped substrate for which the formation of the central hole has been completed from the second processing location to the third processing location, and causes the clear to clean the central hole and its vicinity. With the arrangement of this preferred embodiment, it is possible to positively remove cuttings produced during punching of a central hole by the punching machine.

Preferably, the optical recording medium-manufacturing apparatus comprises a feed mechanism that feeds the disk-shaped substrate to be formed with the cut onto the transfer stage under the control of the control section, and a delivery mechanism that delivers the disk-shaped substrate for which the formation of the central hole has been completed from the transfer stage, under the control of the control section. With the arrangement of this preferred embodiment, it is possible to automate a sequence of operations by the optical recording medium-manufacturing apparatus from the feed of a disk-shaped substrate to the delivery of the completed optical recording medium, which makes it possible to mass-produce the optical recording media.

Preferably, the optical recording medium-manufacturing apparatus comprises a substrate-detecting section that detects the disk-shaped substrate being transferred over a substrate-detecting location defined between a substrate delivery location from which the disk-shaped substrate for which the formation of the central hole has been completed is delivered from the transfer stage and a substrate feed location from which the disk-shaped substrate to be formed with the central hole is fed onto the transfer stage, and the control section executes a predetermined error process when the substrate-detecting section has detected the disk-shaped substrate. With the arrangement of this preferred embodiment, it is possible to prevent an accident of feeding a new disk-shaped substrate onto an optical recording medium which should have been delivered but remains on the transfer stage.

Preferably, the transfer mechanism is configured to be capable of transferring the disk-shaped substrate to be formed with the cut from a substrate feed location from which the substrate is fed onto the transfer stage, to the first processing location, and capable of transferring the disk-shaped substrate for which the formation of the central hole has been completed to a substrate delivery location from which the substrate on the transfer stage is delivered out of the transfer stage. With the arrangement of this preferred embodiment, during formation of a cut at the first processing location, a disk-shaped substrate to be formed with a cut next can be fed to the substrate feed location by the feed mechanism, and the operations of formation and cleaning of a central hole can be started without waiting for the completed optical recording medium to be delivered by the delivery mechanism. This contributes to enhancing manufacturing efficiency of the optical recording media.

Preferably, the cut-forming machine comprises a first disk-holding section that holds the disk-shaped substrate by sucking the other side of the disk-shaped substrate. With the arrangement of this preferred embodiment, it is possible to positively avoid the inconvenience that the disk-shaped substrate is moved upward by the upward movement of the cut-forming blade section.

Preferably, the punching machine includes a second disk-holding section that holds the disk-shaped substrate by sucking the other side of the disk-shaped substrate, and a punched piece-holding section that holds a punched piece which is punched off by the punching blade section. With the arrangement of this preferred embodiment, it is possible to positively avoid the inconvenience that the optical recording medium is moved upward by the upward movement of the punched piece-holding section, so that it is no longer necessary for an operator to manually remove the punched piece from the disk-shaped substrate, which contributes to further enhanced manufacturing efficiency of the optical recording media.

More preferably, the optical recording medium-manufacturing apparatus comprises a collector that collects the punched piece held by the punched piece-holding section. With the arrangement of this preferred embodiment, it is possible to make the manufacturing efficiency of the optical recording media much higher than the case where the sucked punched piece is manually removed by an operator.

It should be noted that the present disclosure relates to the subject matter included in Japanese Patent Application No. 2003-014353 filed on Jan. 23, 2003, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

The invention will now be described with reference to the accompanying drawings showing a preferred embodiment thereof.

First, a description will be given of the arrangement of an optical recording medium-manufacturing apparatus according to the present invention and the construction of an optical recording medium.

Figure 1:
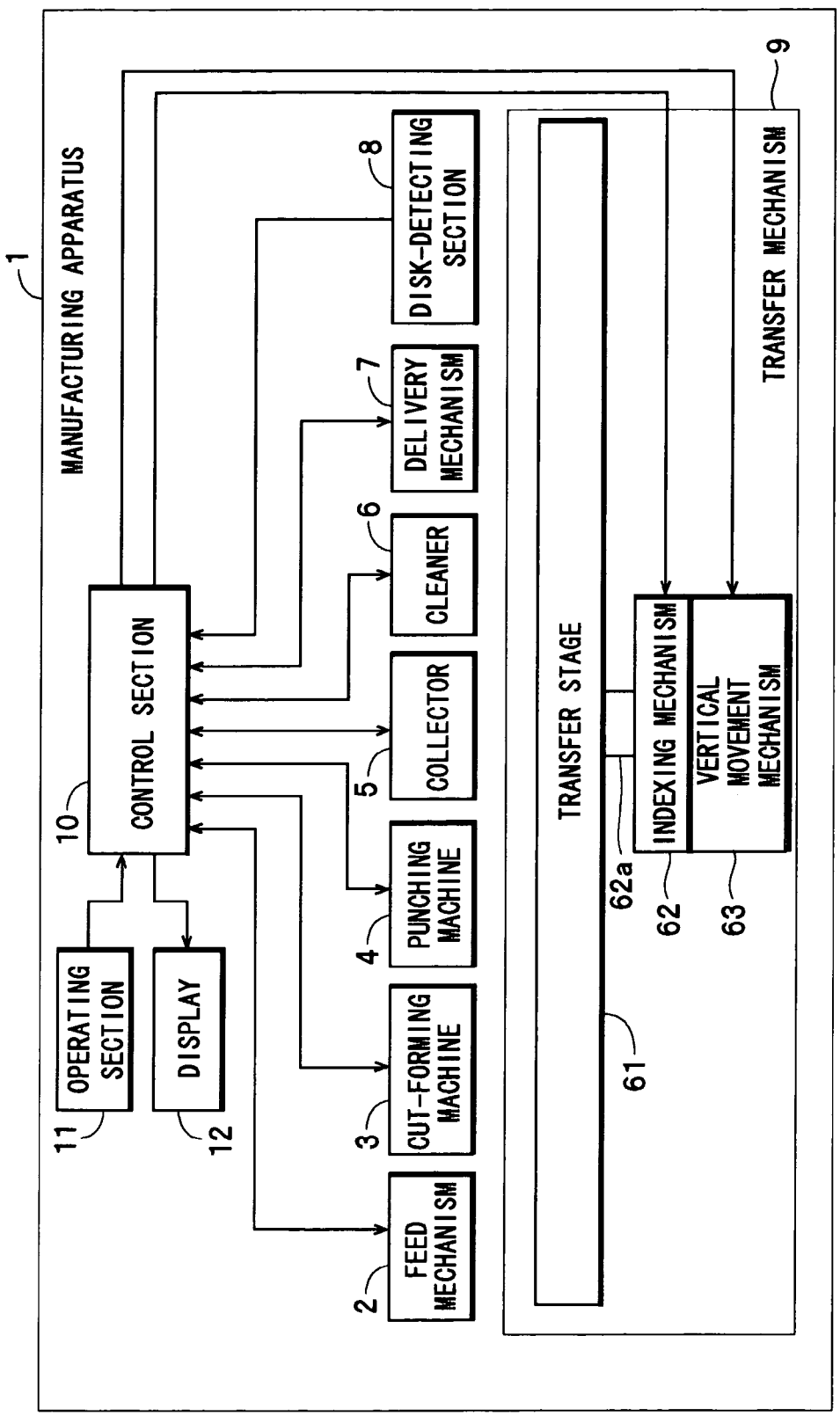
FIG. 1 is a block diagram showing the arrangement of a manufacturing apparatus according to an embodiment of the present invention.
Figure 2:
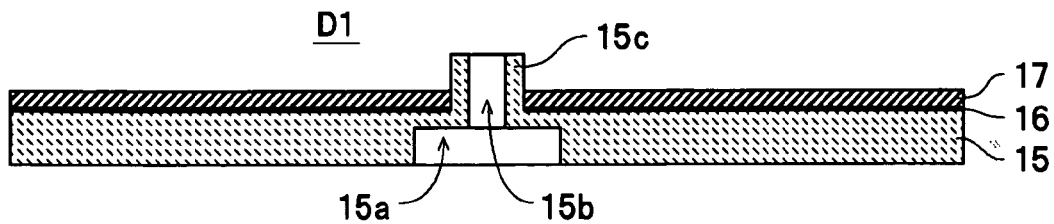
FIG. 2 is a cross-sectional view of a disk-shaped substrate before a cut and a central hole are formed therein.
Figure 3:
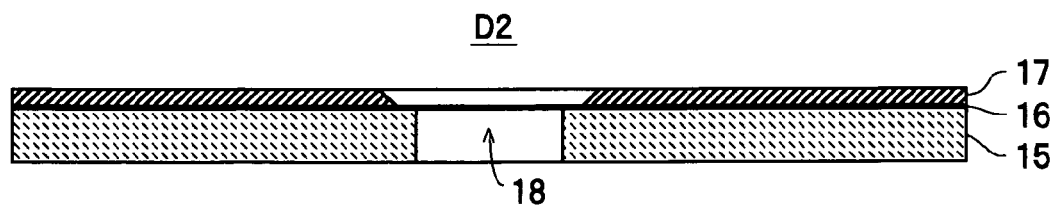
FIG. 3 is a cross-sectional view of an optical recording medium produced by the manufacturing apparatus.

A manufacturing apparatus 1 shown in FIG. 1 corresponds to the optical recording medium-manufacturing apparatus according to the present invention, and manufactures an optical recording medium D2 (see FIG. 3; which corresponds to a disk-shaped substrate for which the formation of the central hole has been completed, in the present invention) by forming a cut 17*a* (see FIG. 7) in a light transmission layer 17 of a disk-shaped substrate D1 (see FIG. 2; which corresponds to a disk-shaped substrate in the present invention), and then punching a central hole 18. In this embodiment, as shown in FIG. 2, the disk-shaped substrate D1 is comprised of a substrate 15 in the form of a disk, thin films 16, such as a light-reflecting layer and a recording layer, sequentially formed on one or upper surface of the substrate 15, and the light transmission layer (resin layer in the present invention) 17 formed such that the layer 17 covers the thin films 16. The substrate 15 is molded by injecting a resin material, such as a polycarbonate, prior to preparation of the disk-shaped substrate D1. In the present embodiment, the other or lower surface of the substrate 15 has a central portion formed with a recess 15a whose bottom surface is to be punched afterwards for formation of the central hole 18. In the illustrated example, the recess 15a is formed to have a diameter of 15 mm, equal (equivalent) to the diameter of the central hole 18. Further, in the upper surface of the substrate 15, there are formed grooves and lands by injection molding, and a hollow cylindrical protrusion 15c formed with a positioning hole 15b for positioning the disk-shaped substrate D1 with respect to a cut-forming machine 3 and a punching machine 4 when the cut 17a and the central hole 18 are formed. In the present embodiment, the positioning hole 15b is formed such that it has a diameter of e.g. 5 mm, and the center thereof coincides with the center of the recess 15a. The light transmission layer 17 is a resin layer for protecting the thin films 16 formed on the substrate 15 and allowing transmission of a laser beam therethrough during reproduction of recorded data. For example, the light transmission layer 17 is coated with an ultraviolet-curing resin material by the spin-coating method, and formed to have a thickness of approximately 100 μm. Further, as shown in FIG. 3, the optical recording medium D2 is constructed by forming the central hole 18 having a diameter of approximately 15 mm through the central portion of the disk-shaped substrate D1. It should be noted that for ease of understanding of the present invention or simplicity, description of the construction of the thin films 16, etc. and the method of forming the same is omitted.

Figure 4:
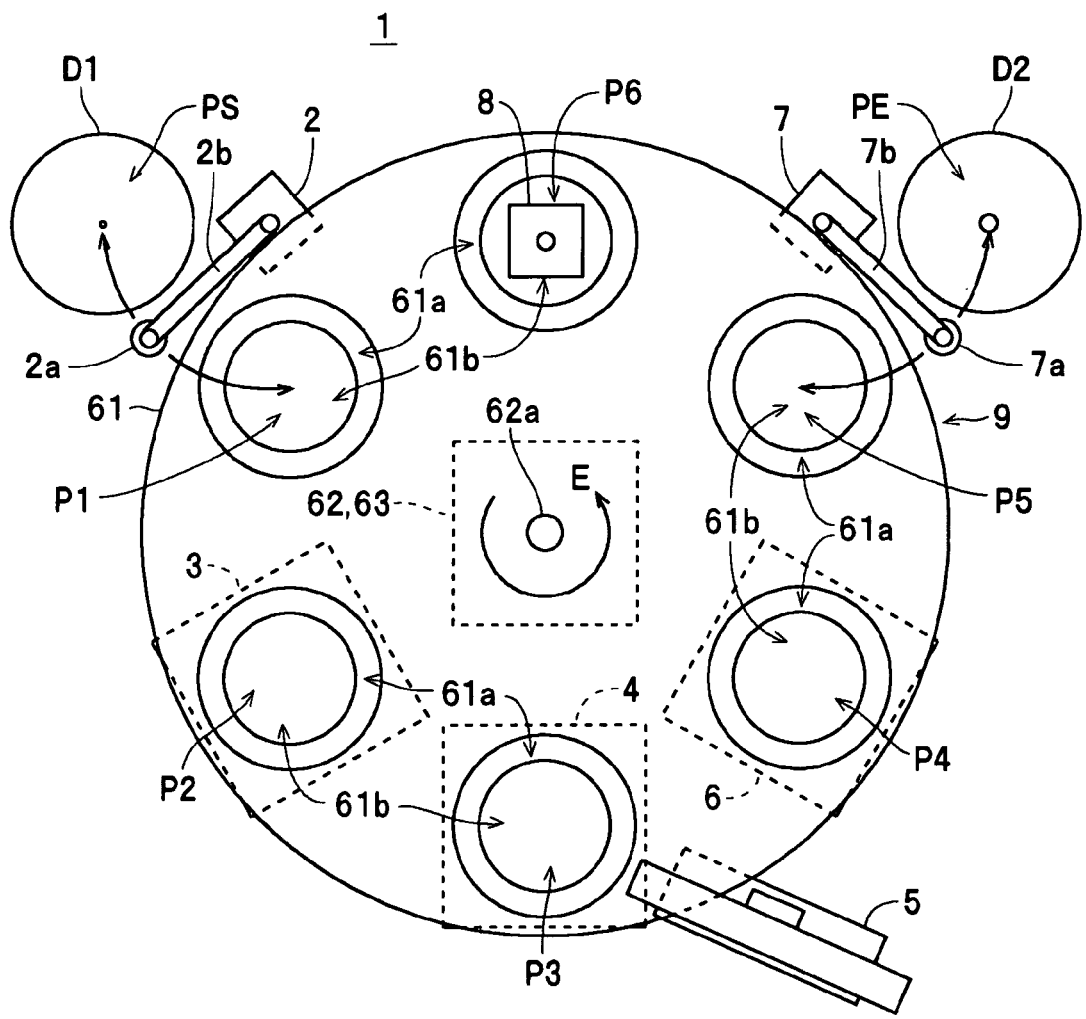
FIG. 4 is a plan view showing the arrangement of the manufacturing apparatus.

Referring to FIG. 1, the manufacturing apparatus 1 is comprised of a feed mechanism 2, the cut-forming machine 3, the punching machine 4, a collector 5, a cleaner 6, a delivery mechanism 7, a disk-detecting section 8, a transfer mechanism 9, a control section 10, an operating section 11, and a display 12. As shown in FIG. 4, the feed mechanism 2 includes a pivot arm 2b which is configured to be vertically movable and has a sucking portion 2a mounted at an end thereof, for holding the disk-shaped substrate D1 thereat by suction. The feed mechanism 2 feeds the disk-shaped substrate D1 from a stack location PS to a feed location P1 under the control of the control section 10. At the stack location PS, there are stacked a plurality of disk-shaped substrates D1, D1 . . . for which formation of a light transmission layer 17 is completed.

Figure 5:
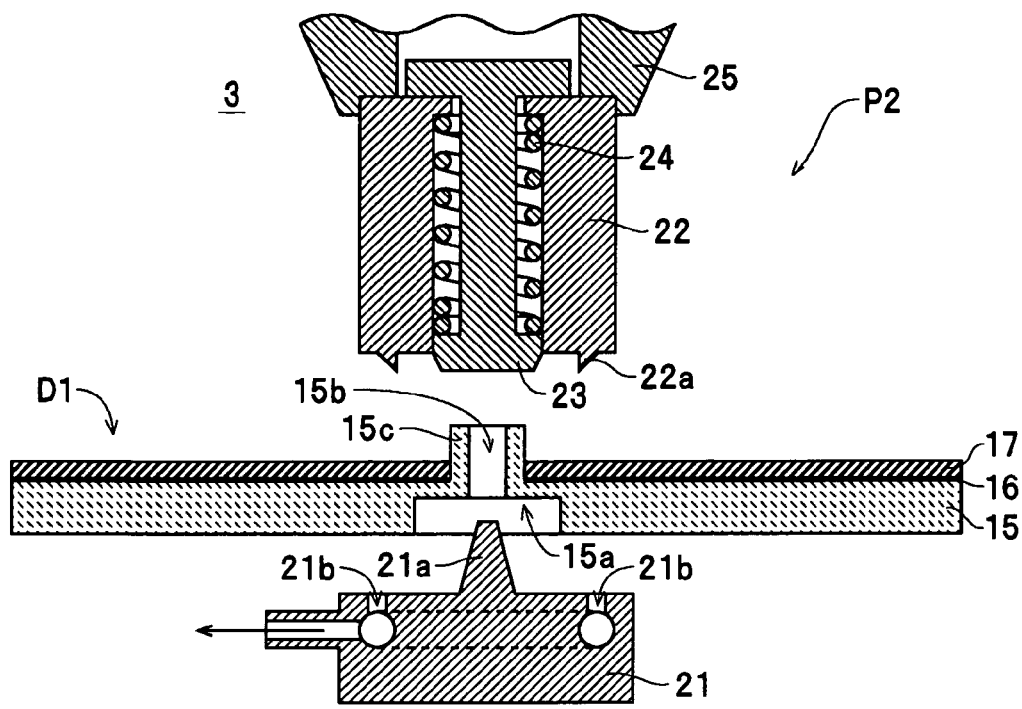
FIG. 5 is a cross-sectional view showing the arrangement of a cut-forming machine of the manufacturing apparatus.

The cut-forming machine 3 includes a table 21, a cut-forming blade section 22, an urging portion 23, a spring 24, and a vertical movement mechanism 25, as shown in FIG. 5, and mounted at a cut-forming location P2, which corresponds to a first processing location in the present invention, as shown in FIG. 4. The table 21, as shown in FIG. 5, has an upper surface formed to be flat such that the disk-shaped substrate D1 can be placed thereon. Further, a positioning protrusion 21a having a truncated conical shape is formed on a central portion of the upper surface of the table 21 in a manner protruding upward therefrom, for being fitted in the positioning hole 15b of the disk-shaped substrate D1, and thereby positioning the disk-shaped substrate D1 with respect to the table 21. Further, the table 21, which corresponds to a first disk-holding section in the present invention, is configured such that a plurality of suction holes 21b, 21b, . . . for attracting the disk-shaped substrate D1 thereto by sucking air existing between the upper surface of the table 21 and the lower surface of the disk-shaped substrate D1 are formed around the positioning protrusion 21a. The cut-forming blade section 22 has a hollow cylindrical shape for being mounted on the vertical movement mechanism 25, with a blade 22a formed on a bottom end face thereof in a protruding manner, for forming a cut 17a (see FIG. 6) in the light transmission layer 17 of the disk-shaped substrate D1. The blade 22a has an annular shape with a diameter of approximately 16 mm, larger than the diameter of the central hole 18. Further, the height of the blade 22a is defined to be approximately 105 μm, which is slightly larger than the thickness (e.g. approximately 100 μm) of the light transmission layer 17, according to the depth of the cut 17a to be formed in the light transmission layer 17. The urging portion 23 is urged downward toward the cut-forming blade section 22 by the spring 24, and when the vertical movement mechanism 25 causes the cut-forming blade section 22 to move downward, the urging portion 23 urges the disk-shaped substrate D1 downward to cause the same to be pressed downward.

Figure 6:
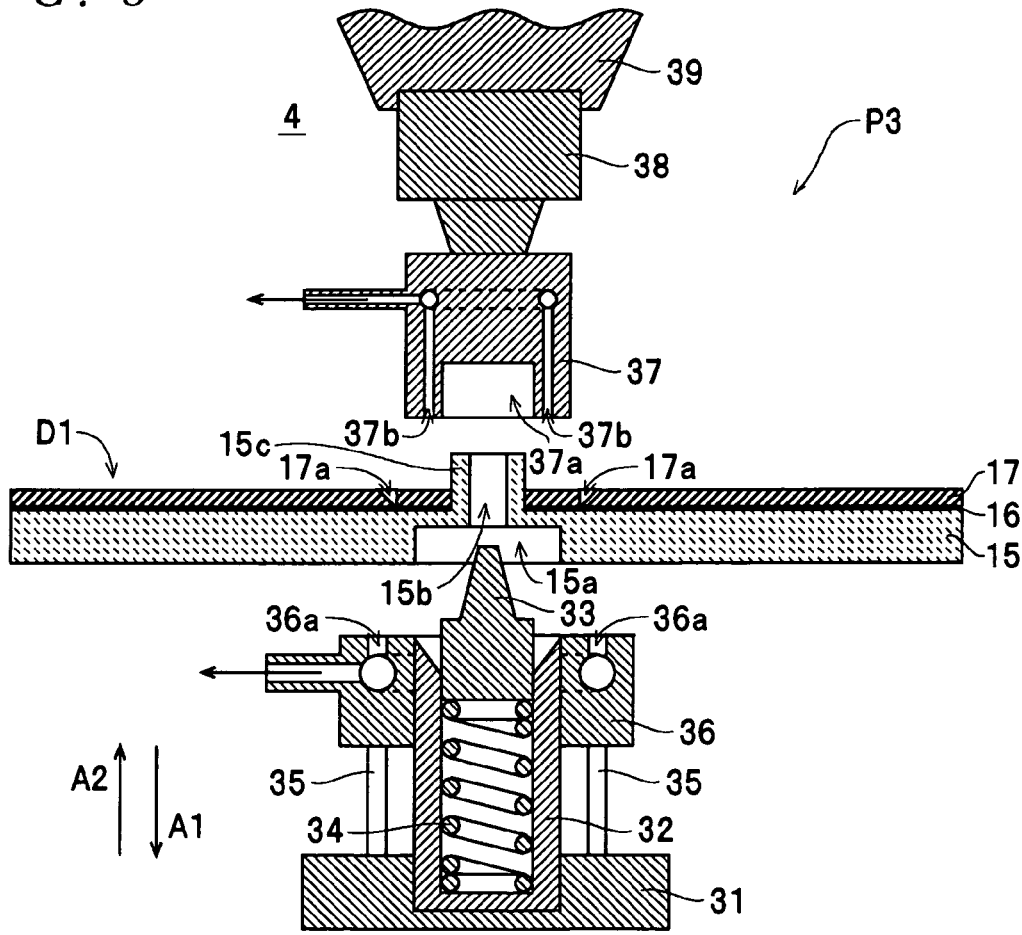
FIG. 6 is a cross-sectional view showing the arrangement of a punching machine of the manufacturing apparatus.

As shown in FIG. 6, the punching machine 4 is comprised of a base 31, a punching blade section 32, a positioning protrusion 33, a spring 34, air cylinders 35, 35, . . . , a substrate-receiving table 36, an ultrasonic horn 37, an ultrasonic generator 38, and a vertical movement mechanism 39. As shown in FIG. 4, the punching machine 4 is disposed at a central hole-forming location P3 which corresponds to a second processing location in the present invention. The punching blade section 32 is, as shown in FIG. 6, in the form of a bottomed hollow cylinder with an outer shape having a diameter (outer diameter) of 15 mm, equal to the inner diameter of the central hole 18, and rigidly fixed to the base 31. The punching blade section 32 is pressed (pushed) into the disk-shaped substrate D1 pushed downward by the vertical movement mechanism 39, to thereby punch the central hole 18 through the disk-shaped substrate D1. The positioning protrusion 33 in the form of a truncated conical shape is disposed within the punching blade section 32, and urged upward by the spring 34 such that the positioning protrusion 33 is fitted into the positioning hole 15b of the disk-shaped substrate D1, for positioning the disk-shaped substrate D1 with respect to the punching blade section 32.

For example, when the disk-shaped substrate D1 is moved downward, e.g. compressed air is supplied to an air chamber formed within the substrate-receiving table 36 by a pressure pump, not shown, whereby the air cylinders 35 allow the translating motion of the substrate-receiving table 36 in a direction indicated by an arrow A1 (in a downward direction) with respect to the base 31, whereas when the disk-shaped substrate D1 is moved upward, compressed air is supplied to an air chamber formed within the base 31 by the pressure pump, whereby the air cylinders 35 allow the translating motion of the substrate-receiving table 36 in a direction indicated by an arrow A2 (in an upward direction) with respect to the base 31. The substrate-receiving table 36 has a generally hollow cylindrical shape and is mounted to the base 31 via the air cylinders 35 such that the substrate-receiving table 36 can be moved upward and downward along the side surface of the punching blade section 32. The substrate-receiving table 36 has an upper surface thereof formed flat such that it can be brought into surface contact with the lower surface of the disk-shaped substrate D1 having the cut 17a formed in the upper surface thereof. Further, the substrate-receiving table 36 is formed with a plurality of suction holes 36a, 36a, . . . for attracting the disk-shaped substrate D1 thereto by sucking air between the upper surface of the substrate-receiving table 36 and the lower surface of the disk-shaped substrate D1. It should be noted that as shown in FIG. 6, the normal or unmoved position of the substrate-receiving table 36 in the direction of height thereof is defined as a position in which a cutting edge of the punching blade section 32 is inhibited from protruding from the upper surface of the substrate-receiving table 36.

The ultrasonic horn 37 has a generally hollow cylindrical shape, and is mounted on the vertical movement mechanism 39 together with the ultrasonic generator 38, for transmitting ultrasonic waves generated by the ultrasonic generator 38 to the disk-shaped substrate D1 while urging on the upper surface of the disk-shaped substrate D1 downward, when the central hole 18 is formed. Further, the ultrasonic horn 37, which corresponds to a punched piece-holding section in the present invention, has a lower surface thereof formed with a recess 37a into which the protrusion 15c of the disk-shaped substrate D1 can be inserted. Furthermore, the ultrasonic horn 37 is formed with a plurality of suction holes 37b, 37b, . . . for sucking air around the protrusion 15c of a punched piece CH (see FIG. 16) punched off by the punching blade section 32 (air on the upper surface of the light transmission layer 17) to thereby attract the punched piece CH thereto. The ultrasonic generator 38 generates ultrasonic waves under the control of the control section 10 to vibrate the ultrasonic horn 37, thereby applying ultrasonic vibration to the disk-shaped substrate D1 via the ultrasonic horn 37.

Figure 7:
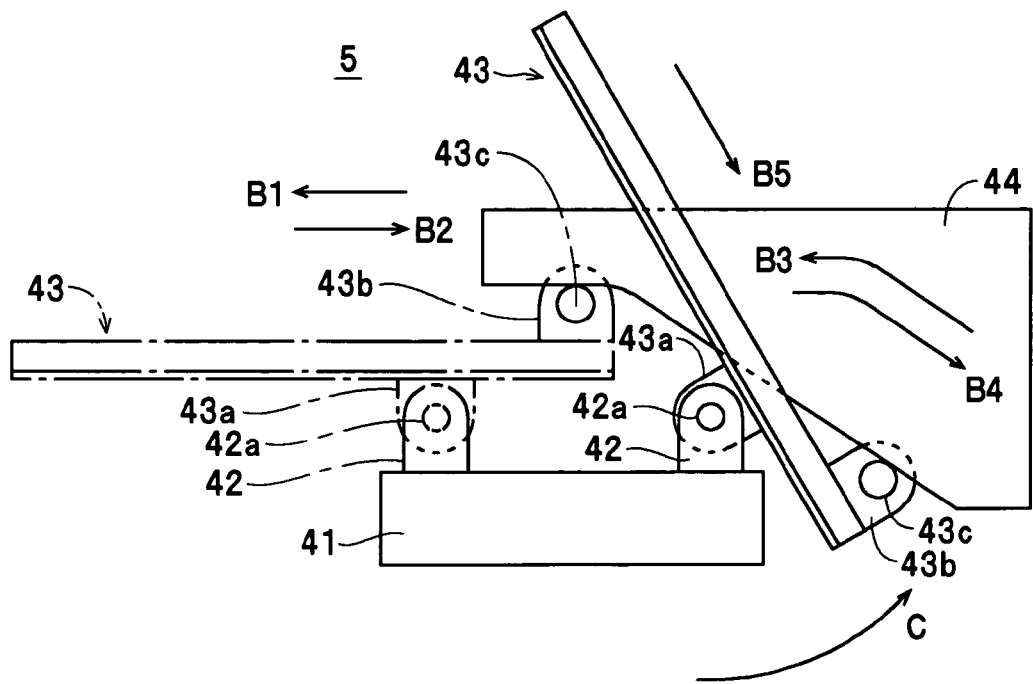
FIG. 7 is a side view showing the arrangement of a collector of the manufacturing apparatus.

Referring to FIG. 7, the collector 5 is comprised of a moving mechanism 41, a collecting arm 43, and a slider 44, and disposed at a location on a side of the central hole-forming location P3 in which the punching machine 4 is mounted, as shown in FIG. 4. As shown in FIG. 7, the moving mechanism 41 causes the stay 42 to slide in directions indicated by arrows B1 and B2 in FIG. 7 (in the directions of moving toward and away from the punching machine 4), under the control of the control section 10. The collecting arm 43 is made by forming e.g. a metal plate which is surface-treated for reducing sliding resistance, such that it has a generally U-shaped cross section opening upward, and pivotally mounted on a pivot 42a of the stay 42 of the moving mechanism 41 via a stay 43a. Further, the collecting arm 43 includes a stay 43b rigidly fixed to a rear end thereof and a slide pin 43c attached to the stay 43b, and is urged e.g. by a helical spring, not shown, mounted around the pivot 42a in a direction indicated by an arrow C.

When the stay 42 is caused to slide by the moving mechanism 41 in the direction indicated by the arrow B1, the slide pin 43c is caused to slide along the underside surface of the slider 44 in a direction indicated by an arrow B3. At this time, while being changed from an inclined position indicated by solid lines to a horizontal position indicated by one-dot chain lines, the collecting arm 43 has its free end advanced into between the punched piece CH attracted by the ultrasonic horn 37 of the punching machine 4 and the optical recording medium D2 (disk-shaped substrate D1 having the central hole 18 formed by punching). In this state, when the sucking or attraction of the punched piece CH by the ultrasonic horn 37 is stopped, the punched piece CH falls onto the free end of the collecting arm 43. Further, when the stay 42 is caused to slide by the moving mechanism 41 in the direction indicated by the arrow B2, the slide pin 43c is caused to slide along the underside surface of the slider 44 in a direction indicated by an arrow B4. In this case, while being changed from the horizontal position indicated by the one-dot chain lines to the inclined position indicated by the solid lines, the collecting arm 43 has its free end retracted from the upper surface of the optical recording medium D2. In this case, the punched piece CH having fallen onto the free end of the collecting arm 43 slides downward along the collecting arm 43 in a direction indicated by an arrow B5 to fall onto a predetermined collecting area.

Figure 8:
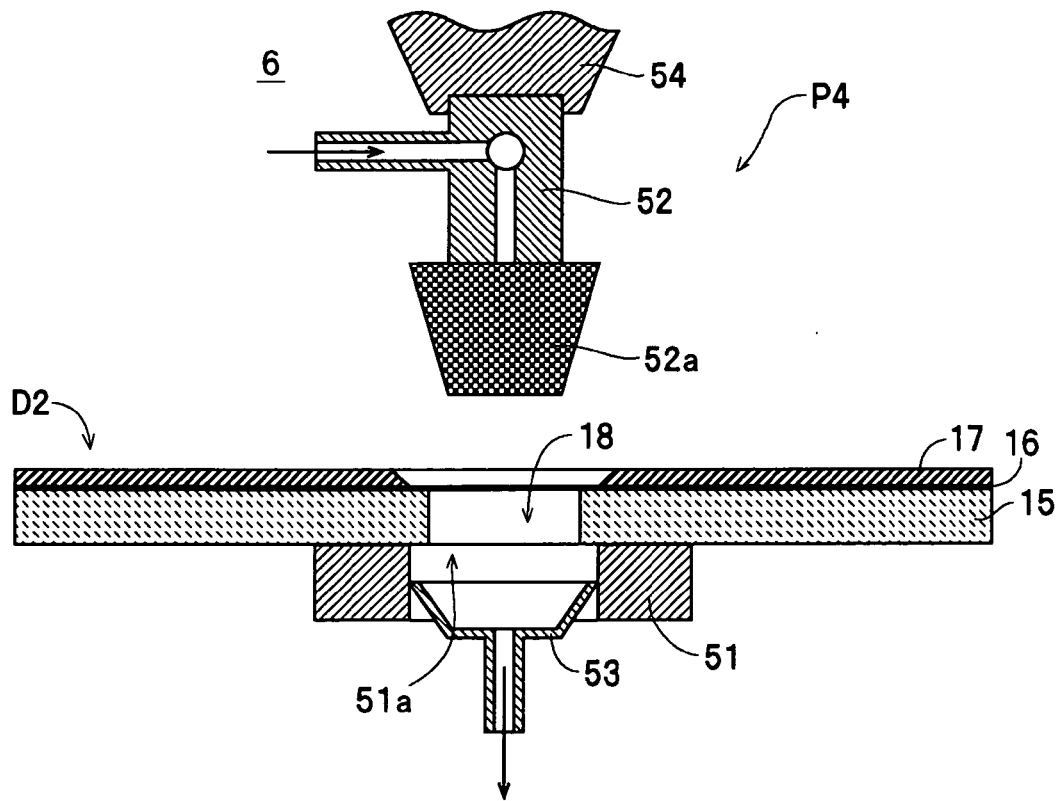
FIG. 8 is a cross-sectional view showing the arrangement of a cleaner of the manufacturing apparatus.

Referring to FIG. 8, the cleaner 6 is comprised of a table 51, a blowing section 52, a sucking section 53, and a vertical movement mechanism 54, and disposed at a cleaning location P4, which corresponds to a third processing location in the present invention, as shown in FIG. 4. As shown in FIG. 8, the table 51 is configured to be capable of supporting the optical recording medium D2 placed thereon, and formed with a central hole 51a having a diameter larger than that of the central hole 18 and extending through a central portion thereof. The blowing section 52 has a nozzle 52a mounted on an end thereof, which is made of a porous material and has a truncated conical shape. The blowing section 52 is moved downward toward the optical recording medium D2 on the table 51 by the vertical movement mechanism 54. Further, the blowing section blows compressed air (an example of a gas in the present invention) supplied under pressure from a pressure pump (compressor), not shown, toward the optical recording medium D2 from the nozzle 52a. In the present embodiment, the nozzle 52a is formed such that the diameter of a distal end (lower end) thereof is smaller than that of the central hole 18, and the diameter of a root end (upper end) thereof is larger than that of the central hole 18. The sucking section 53 is disposed in the central hole 51a of the table 51, and connected to a suction pump, not shown, to thereby suck air (gas) from the vicinity of or through the central hole 18 of the optical recording medium D2 on the table 51. The cleaner 6 may also be configured such that only one of the blowing section 52 and the sucking section 53 is provided. Further, it is possible to blow gas, such as nitrogen gas, toward the optical recording medium D2 in place of the compressed air.

The delivery mechanism 7 includes a sucking section 7a mounted on a distal end thereof, for sucking the optical recording medium D2 thereto, and a pivot arm 7b constructed in a vertically movable fashion, as shown in FIG. 4. The delivery mechanism 7 transfers the optical recording medium D2 from a delivery location P5 to a stack location PE under the control of the control section 10. At the stack location PE, a plurality of optical recording media D2, D2 . . . , each having the central hole 18 formed therein (completed), are stacked. The disk-detecting section 8, which corresponds to a substrate-detecting section in the present invention, is comprised of a light-emitting element and a light-receiving element, by way of example, and installed at a detecting location P6 which corresponds to a substrate-detecting location in the present invention. When the optical recording medium D2 is transferred to the detecting location P6 by the transfer mechanism 9, the disk-detecting section 8 detects the optical recording medium D2 moving (passing) over the detecting location P6 from the delivery location P5 to the feed location P1, and delivers a signal indicative of the detection to the control section 10.

Figure 9:
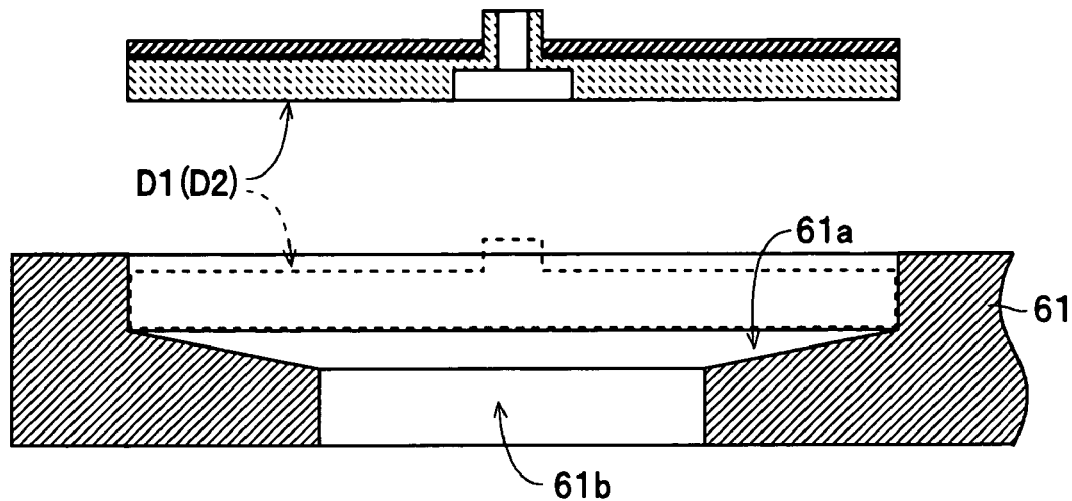
FIG. 9 is a fragmentary cross-sectional view of a transfer mechanism (transfer stage) of the manufacturing apparatus.

Referring to FIG. 1, the transfer mechanism 9 is comprised of a transfer stage 61, an indexing mechanism 62, and a vertical movement mechanism 63. As shown in FIG. 4, the transfer stage 61 is generally disk-shaped, and mounted on the indexing mechanism 62 via a rotational shaft 62a. Further, the transfer stage 61 is formed with six disk-placing recesses 61a, 61a, . . . each capable of having disk-shaped substrates D1 (optical recording media D2) placed therein. The disk-placing recesses 61a, 61a, . . . are formed at respective locations at the same distance from the center of the transfer stage 61, and at the same time at circumferentially equal intervals. Further, as shown in FIG. 9, each disk-placing recess 61a has a bottom thereof formed with a working hole 61b for enabling the cut-forming machine 3, and the punching machine 4, or the like to be brought into abutment with the lower surface of the disk-shaped substrate D1 (optical recording medium D2) placed in the disk-placing recess 61a. The indexing mechanism 62, which corresponds to an indexing device in the present invention, intermittently rotates i.e. indexes the transfer stage 61 under the control of the control section 10 each time through 60 degrees in a direction indicated by an arrow E in FIG. 4, to thereby transfer the disk-shaped substrate D1 (optical recording medium D2) placed in the disk-placing recess 61a of the transfer stage 61 sequentially to the feed location P1, the cut-forming location P2, the central hole-forming location P3, the cleaning location P4, and the delivery location P5. The vertical movement mechanism 63 moves the transfer stage 61 upward and downward under the control of the control section 10, to thereby move the disk-shaped substrates D1 (optical recording media D2) placed on the transfer stage 61 upward and downward with respect to the cut-forming machine 3, the punching machine 4, and so forth.

The control section 10 controls the operations of the feed mechanism 2, the cut-forming machine 3, the punching machine 4, the collector 5, the cleaner 6, the delivery mechanism 7, and the transfer mechanism 9. Further, when a predetermined signal is output by the disk-detecting section 8, the control section 10 carries out a stop process (predetermined error process in the present invention) for stopping the operation of the manufacturing apparatus 1. The operating section 11 includes a start button for starting manufacturing of optical recording media D2 by the manufacturing apparatus 1, a stop button for stopping the operation of the manufacturing apparatus 1, and so forth, neither of which is shown. The display 12 displays various kinds of information e.g. concerning operating states of the manufacturing apparatus 1 under the control of the control section 10.

Next, a method of manufacturing the optical recording media D2 by the manufacturing apparatus 1 will be described with reference to drawings. It is assumed here that the manufacturing of the disk-shaped substrate D1 (injection molding of the substrate 15, and formation of the thin films 16 and the light transmission layer 17 on the upper surface of the substrate 15) has already been completed, and a plurality of the disk-shaped substrates D1, D1 . . . are stacked at the stack location PS.

Figure 10:
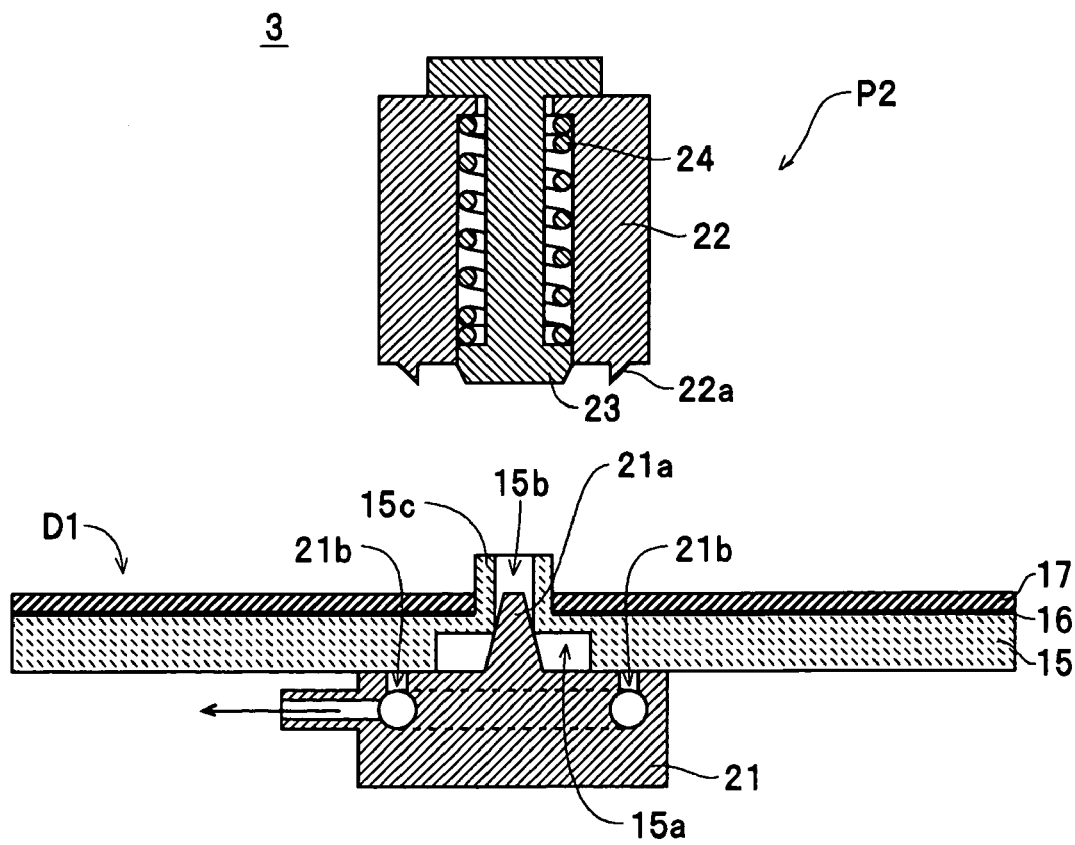
FIG. 10 is a cross-sectional view of the cut-forming machine in a state in which a disk-shaped substrate is sucked to a table of the cut-forming machine.

When the start button of the operating section 11 is operated by an operator, first, the control section 10 causes the feed mechanism 2 to feed one of the disk-shaped substrates D1 from the stack location PS to the feed location P1. In doing this, first, the feed mechanism 2, after pivoting the pivot arm 2b to the stack location PS and then moving the same downward, sucks a central portion (around the protrusion 15c) of the front surface of the disk-shaped substrate D1 thereto by the sucking portion 2a. Then, after moving the pivot arm 2b upward, pivoting the same to the feed location P1, and then moving the same downward, the feed mechanism 2 stops the sucking of the disk-shaped substrate D1 by the sucking portion 2a, at a location upward of the disk-placing recess 61a of the transfer stage 61. Thus, as indicated by broken lines in FIG. 9, the feed of the disk-shaped substrate D1 onto the transfer stage 61 (feed of the disk-shaped substrate D1 onto the feed location P1) is completed. Then, the control section 10 causes the transfer mechanism 9 to transfer the disk-shaped substrate D1 placed on the transfer stage 61 from the feed location P1 to the cut-forming location P2. In doing this, in the transfer mechanism 9, first, the vertical movement mechanism 63 lifts the transfer stage 61, then the indexing mechanism 62 rotates the transfer stage 61 through 60 degrees in the direction indicated by the arrow E shown in FIG. 4, and thereafter the vertical movement mechanism 63 lowers the transfer stage 61. Thus, the transfer of the disk-shaped substrate D1 from the feed location P1 to the cut-forming location P2 is completed. In this case, as shown in FIG. 10, when the disk-shaped substrate D1 transferred to the cut-forming location P2 by the transfer mechanism 9 is lowered by the vertical movement mechanism 63, the positioning protrusion 21a of the table 21 is fitted into the positioning hole 15b of the disk-shaped substrate D1 from the lower surface side thereof, whereby the central portion of the disk-shaped substrate D1 is aligned with (positioned with respect to) the central portion of the table 21. It should be noted that for ease of understanding of the present invention, the illustration of the transfer stage 61 etc. is omitted in FIGS. 10 to 18 with reference to which the present embodiment is described.

Figure 11:
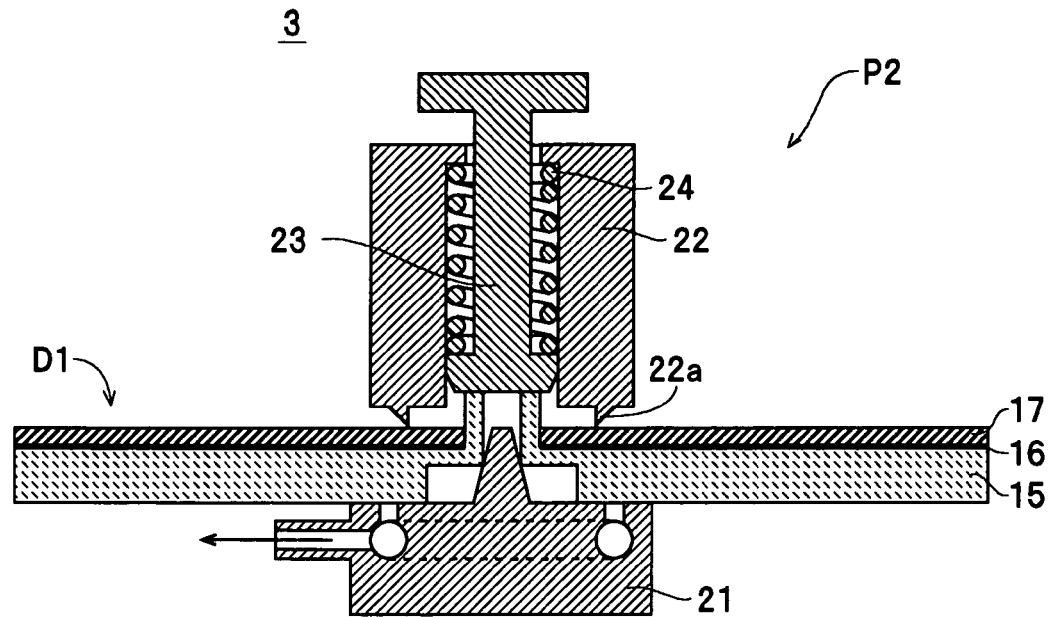
FIG. 11 is a cross-sectional view of the cut-forming machine in a state in which the blade of the cut-forming blade section is brought into abutment with the disk-shaped substrate in the state shown in FIG. 10.
Figure 12:
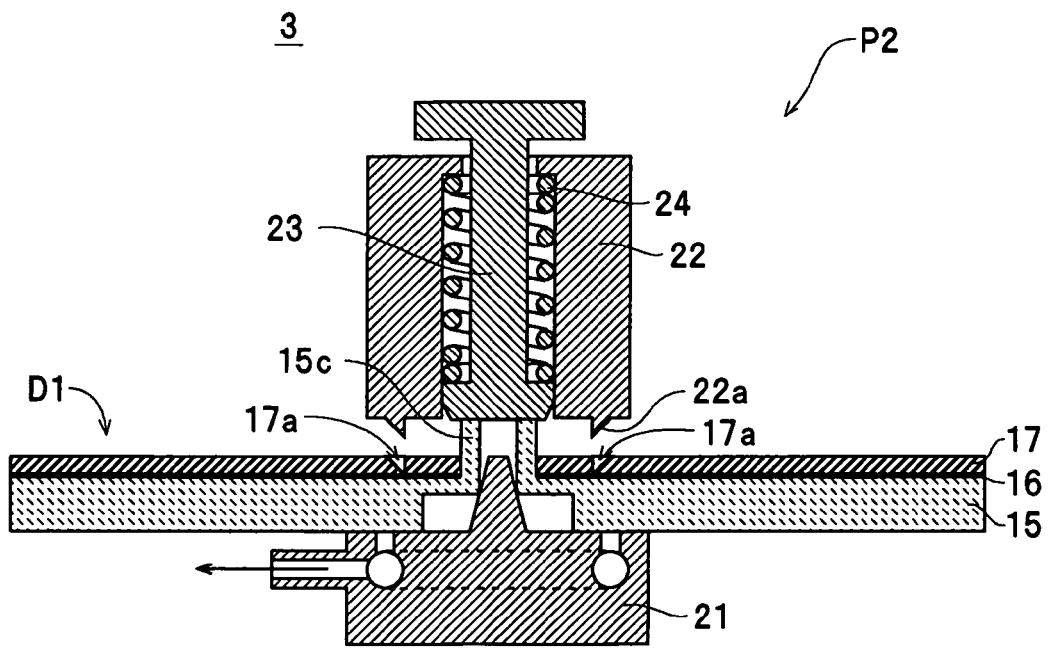
FIG. 12 is a cross-sectional view of the cut-forming machine in a state in which the cut-forming blade section is moved upward after completion of forming a cut in the disk-shaped substrate.

Next, the control section 10 causes the cut-forming machine 3 to form a cut 17a in the light transmission layer 17 of the disk-shaped substrate D1. More specifically, first, the control section 10 causes a suction pump, not shown, to operate for sucking air between the lower surface of the disk-shaped substrate D1 and the upper surface of the table 21 through the suction holes 21b, 21b, . . . Thus, the lower surface of the disk-shaped substrate D1 (around the recess 15a) is brought into intimate contact with the upper surface of the table 21 whereby the disk-shaped substrate D1 is held. Next, the control section 10 causes the vertical movement mechanism 25 to move the cut-forming blade section 22 downward toward the disk-shaped substrate D1. In doing this, as the cut-forming blade section 22 is moved downward, first, the lower end face of the urging portion 23 is brought into abutment with the upper end of the protrusion 15c, and in this state, the cut-forming blade section 22 is moved further downward, whereby, as shown in FIG. 11, the cutting edge of the blade 22a is brought into abutment with the upper surface of the light transmission layer 17 of the disk-shaped substrate D1. Then, when the cut-forming blade section 22 is moved further downward by the vertical movement mechanism 25, the blade 22a is pushed into the light transmission layer 17. Since the height of the blade 22a is defined such that it is slightly larger than the thickness of the light transmission layer 17, if the cut-forming blade section 22 is moved downward until the bottom end face of the cut-forming blade section 22 is brought into abutment with the upper surface of the light transmission layer 17, the cutting edge of the blade 22a reaches the upper surface of the substrate 15. Thus, in the light transmission layer 17, there is formed a circular cut 17a (see FIG. 12) which has a diameter approximately equal to the diameter (16 mm, in the illustrated example) of the blade 22a. Then, as shown in FIG. 12, the control section 10 causes the vertical movement mechanism 25 to move the cut-forming blade section 22 upward. In doing this, since the disk-shaped substrate D1 is being urged on the table 21 by the urging portion 23 and attracted to the table 21, it is possible to positively avoid the inconvenience that the disk-shaped substrate D1 is moved upward together with the cut-forming blade section 22 whose blade 22a remains stuck therein. Thus, formation of the cut 17a in the disk-shaped substrate D1 is completed. Further, the control section 10 causes the feed mechanism 2 to feed a new disk-shaped substrate D1 from the stack location PS to the feed location P1 in parallel with the operation of forming the cut 17a by the cut-forming machine 3 at the cut-forming location P2.

Figure 13:
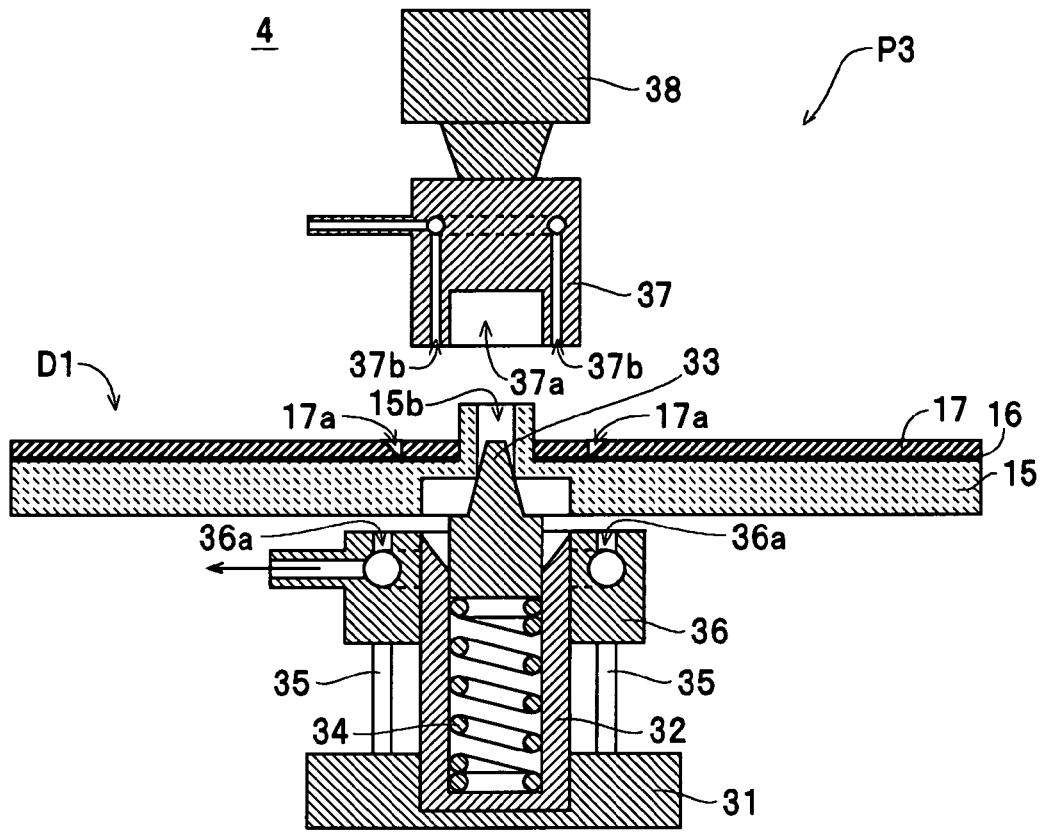
FIG. 13 is a cross-sectional view of the punching machine in a state in which a positioning protrusion of the punching machine is fitted in a positioning hole of the disk-shaped substrate.

Then, the control section 10 stops the suction pump, thereby stopping the sucking of the disk-shaped substrates D1 to the table 21, and then causes the transfer mechanism 9 to transfer the disk-shaped substrate D1 having the cut 17a formed therein, from the cut-forming location P2 to the central hole-forming location P3. While the disk-shaped substrate D1 formed with the cut 17a is transferred, the new disk-shaped substrate D1 fed to the feed location P1 is transferred from the feed location P1 to the cut-forming location P2 in accordance with rotation of the transfer stage 61. On the other hand, as shown in FIG. 13, the disk-shaped substrate D1 formed with the cut 17a transferred to the central hole-forming location P3 has the positioning protrusion 33 fitted into the positioning hole 15b thereof from the lower surface side of the disk D1 along with the downward movement of the transfer stage 61, whereby the center of the disk-shaped substrate D1 is substantially aligned with the center of the punching blade section 32. Subsequently, the control section 10 causes the punching machine 4 to form a central hole 18 in the central portion of the disk-shaped substrate D1. More specifically, first, the control section 10 causes the vertical movement mechanism 39 to move the ultrasonic generator 38 and the ultrasonic horn 37 downward toward the disk-shaped substrate D1. In doing this, first, the bottom surface of the ultrasonic horn 37 is brought into abutment with the front surface of the disk-shaped substrate D1, and in this state, when the ultrasonic horn 37 is moved further downward, the disk-shaped substrate D1 is moved downward while the spring 34 is compressed. Further, the control section 10 causes the suction pump, not shown, to operate for sucking air between the lower surface of the disk-shaped substrate D1 and the upper surface of the substrate-receiving table 36 through the suction holes 36a, 36a . . .

Figure 14:
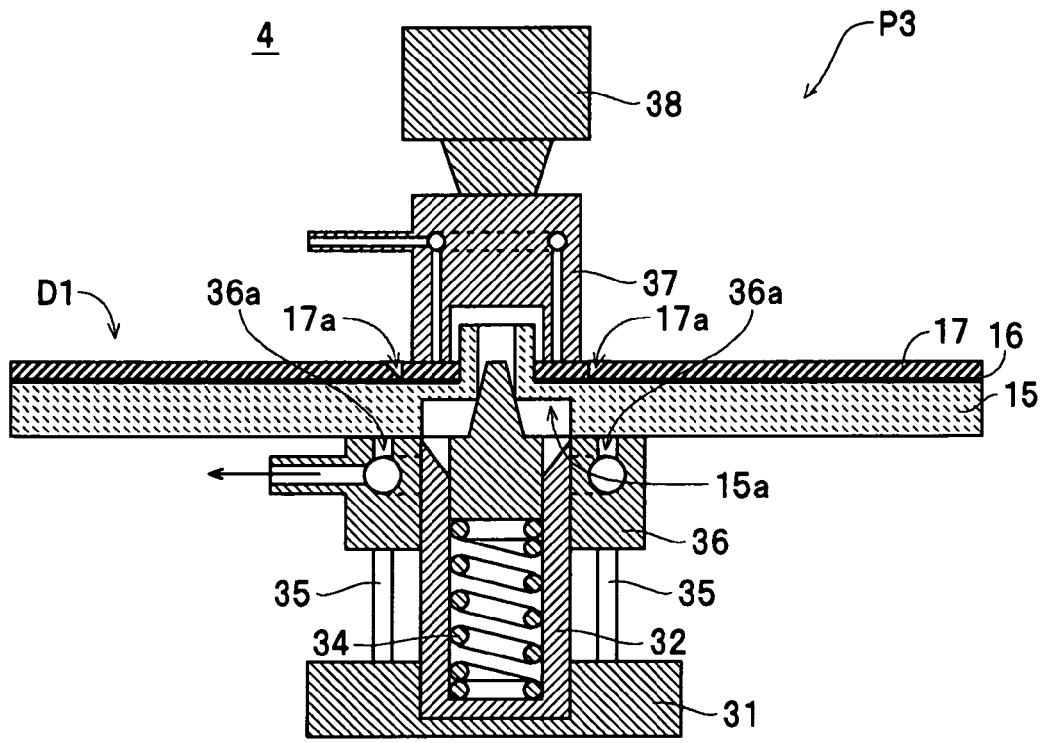
FIG. 14 is a cross-sectional view of the punching machine in a state in which the disk-shaped substrate is brought into abutment with a substrate-receiving table, after having been moved downward by an ultrasonic horn.

Next, when the disk-shaped substrate D1 is moved further downward by the vertical movement mechanism 39, the spring 34 is further compressed and the positioning protrusion 33 causes the center of the disk-shaped substrate D1 to be aligned with (positioned with respect to) the center of the punching blade section 32. In this state, as shown in FIG. 14, the lower surface of the disk-shaped substrate D1 is brought into intimate contact with the upper surface of the substrate-receiving table 36, whereby the disk-shaped substrate D1 is held by the substrate-receiving table 36. Then, the control section 10 causes the ultrasonic generator 38 to generate ultrasonic waves, while causing the vertical movement mechanism 39 to continue to move the disk-shaped substrate D1 downward. In this case, the ultrasonic horn 37 is caused to perform ultrasonic vibration by the ultrasonic waves generated by the ultrasonic generator 38, and the vibration is transmitted to the disk-shaped substrate D1. Subsequently, when the disk-shaped substrate D1 is moved further downward by the vertical movement mechanism 39, the substrate-receiving table 36 is moved downward together with the disk-shaped substrate D1 such that the air cylinders 35, 35, . . . are compressed, whereby the cutting edge of the punching blade section 32 enters the recess 15a of the disk-shaped substrate D1. At this time, since the outer diameter (e.g. 15.04 mm) of the punching blade section 32 is slightly smaller than the inner diameter (e.g. 15.06 mm) of the recess 15a, the punching blade section 32 is moved upward relative to the disk-shaped substrate D1 without rubbing the outer peripheral surface thereof against the inner wall surface of the recess 15a.

Figure 15:
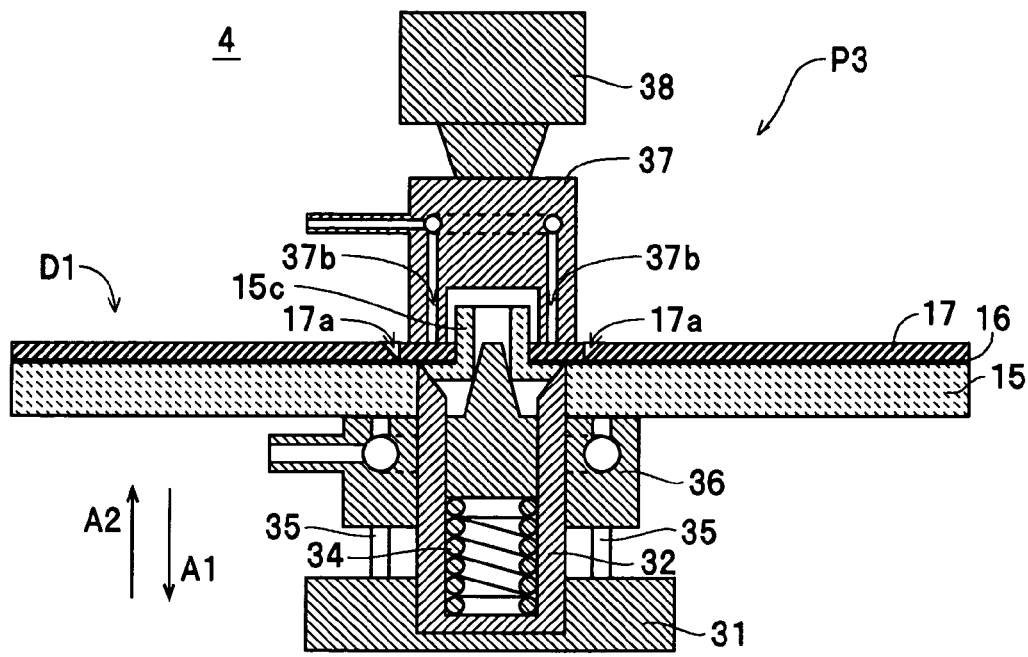
FIG. 15 is a cross-sectional view of the punching machine in a state in which a cutting edge of a punching blade section is pushed into the disk-shaped substrate by moving the disk-shaped substrate in the state shown in FIG. 14 further downward.

Then, after the disk-shaped substrate D1 is moved further downward by the vertical movement mechanism 39, thereby causing the cutting edge of the punching blade section 32 to be brought into abutment with the bottom surface of the recess 15a, as shown in FIG. 15, the disk-shaped substrate D1 is moved further downward, whereby the cutting edge of the punching blade section 32 is pushed into the substrate 15. At this time, since the disk-shaped substrate D1 is caused to perform ultrasonic vibration by the ultrasonic waves transmitted via the ultrasonic horn 37, the cutting edge of the punching blade section 32 is smoothly pushed into the substrate 15. Further, since the substrate 15 has the recess 15a formed therein when it is prepared, it is possible to form the central hole 18 by punching a portion having a far smaller thickness compared with the case of punching a substrate without the recess 15a.

Figure 16:
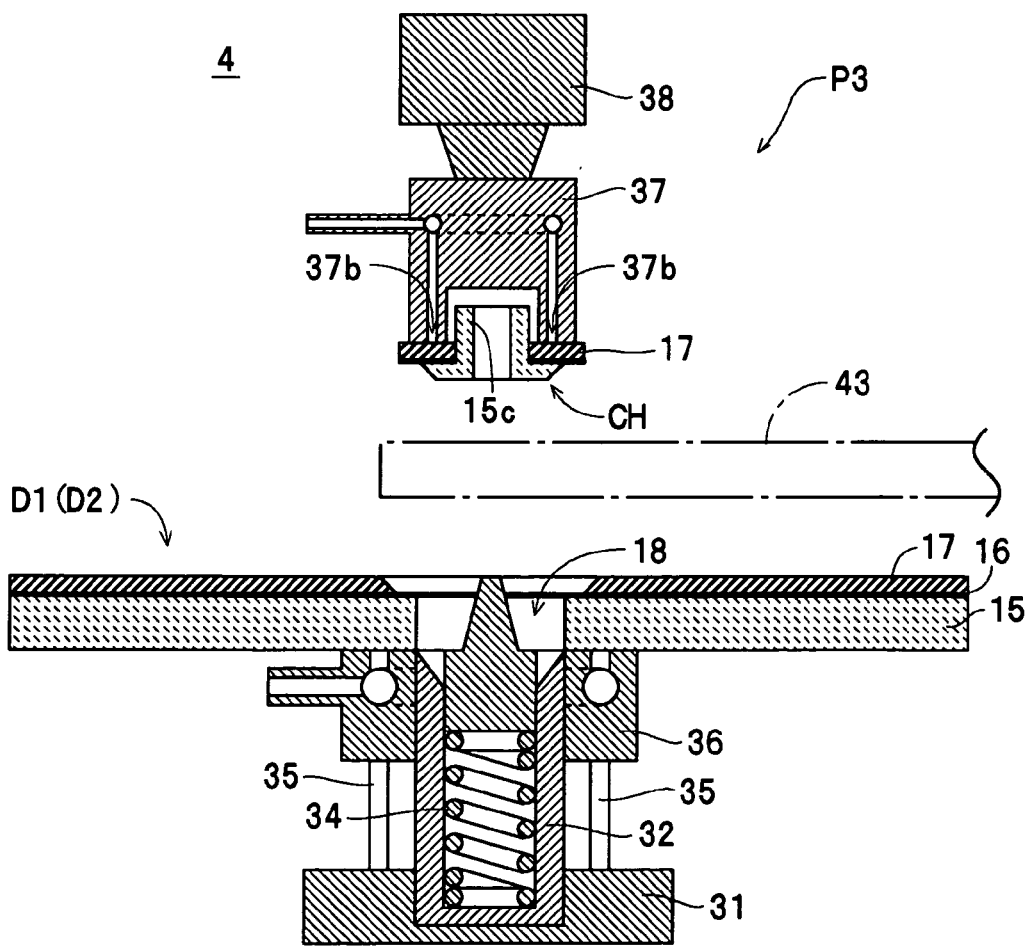
FIG. 16 is a cross-sectional view of the punching machine in a state in which the ultrasonic horn is moved upward after punching the central hole is formed by punching.

Next, the control section 10 causes the suction pump, not shown, to operate for sucking air between the front surface (around the protrusion 15c) of the disk-shaped substrate D1 and the underside surface of the ultrasonic horn 37 through the suction holes 37b, 37b . . . As a result, the punched piece CH (see FIG. 16) punched off by the punching blade section 32 is sucked (held) by the ultrasonic horn 37. Then, the control section 10 causes the vertical movement mechanism 39 to move the ultrasonic generator 38 and the ultrasonic horn 37 upward. At this time, the disk-shaped substrate D1 is moved upward along with the upward movement of the ultrasonic horn 37, whereby the air cylinders 35, 35, . . . are extended to move the substrate-receiving table 36 upward for translating motion. Further, when the ultrasonic horn 37 is moved further upward to fully extend the air cylinders 35, 35, . . . , as shown in FIG. 16, the punched piece CH sucked to the ultrasonic horn 37 is separated from the disk-shaped substrate D1 (substrate 15) and moved upward together with the ultrasonic horn 37. At this time, sine the disk-shaped substrate D1 is sucked and held at the substrate-receiving table 36, it is possible to avoid the inconvenience that the disk-shaped substrate D1 is moved upward together with the punched piece CH and the ultrasonic horn 37. Thus, formation of the central hole 18 through the disk-shaped substrate D1 is completed (in the following description, the disk-shaped substrate D1 having the central hole 18 formed therethrough is also referred to as the "optical recording medium D2"). It should be noted that the control section 10 causes the cut-forming machine 3 to form the cut 17a at the cut-forming location P2 in parallel with the operation of forming the central hole 18 by the punching machine 4 at the central hole-forming location P3, and at the same time causes the feed mechanism 2 to feed a new disk-shaped substrate D1 from the stack location PS to the feed location P1.

Then, the control section 10 causes the collector 5 to collect the punched piece CH. More specifically, the control section 10 causes the moving mechanism 41 of the collector to slide the stay 42 in the direction indicated by the arrow B1 in FIG. 7, thereby causing the free end of the collecting arm 43 to advance between the optical recording medium D2 on the substrate-receiving table 36 and the punched piece CH sucked to the ultrasonic horn 37, as indicated by one-dot chain lines in FIG. 16. Then, the control section 10 stops the operation of the suction pump, thereby stopping the sucking of the punched piece CH by the ultrasonic horn 37, whereupon the punched piece CH sucked by the ultrasonic horn 37 is dropped off onto the collecting arm 43. Subsequently, the control section 10 causes the moving mechanism 41 of the collector 5 to slide the stay 42 in the direction indicated by the arrow B2 in FIG. 7, thereby retracting the collecting arm

43. This causes the collecting arm 43 to be inclined, whereby the punched piece CH is slid downward from the free end of the collecting arm 43 in the direction of the root end thereof to be dropped to a predetermined collecting location. Thus, the collection of the punched piece CH is completed.

Figure 17:
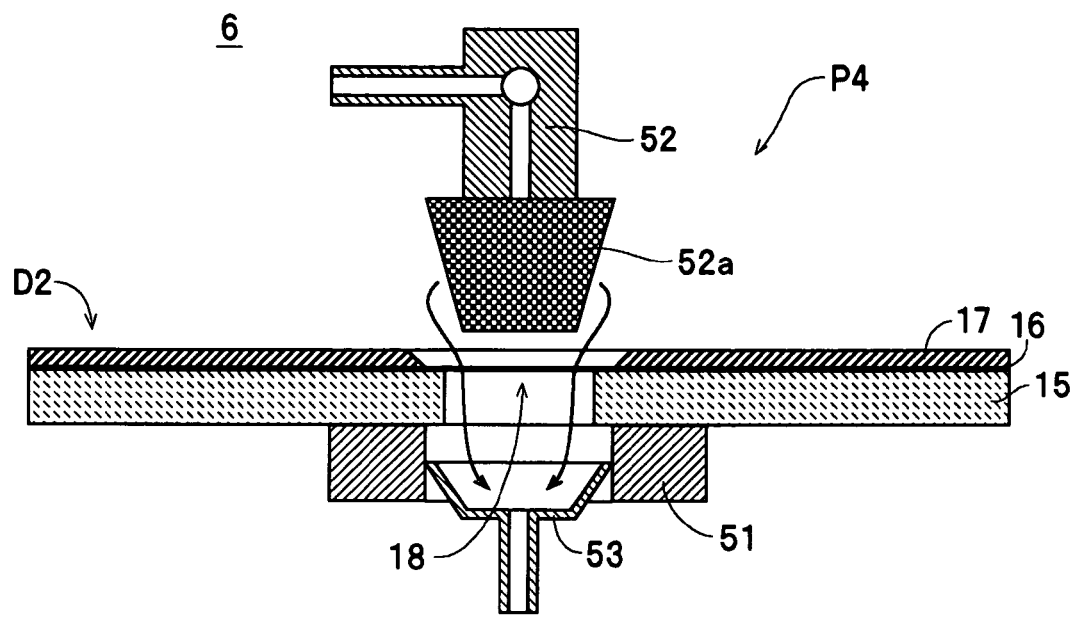
FIG. 17 is a cross-sectional view of the cleaner in a state in which a blowing section of the cleaner is moved to a position over the central hole of the disk-shaped substrate, for cleaning.
Figure 18:
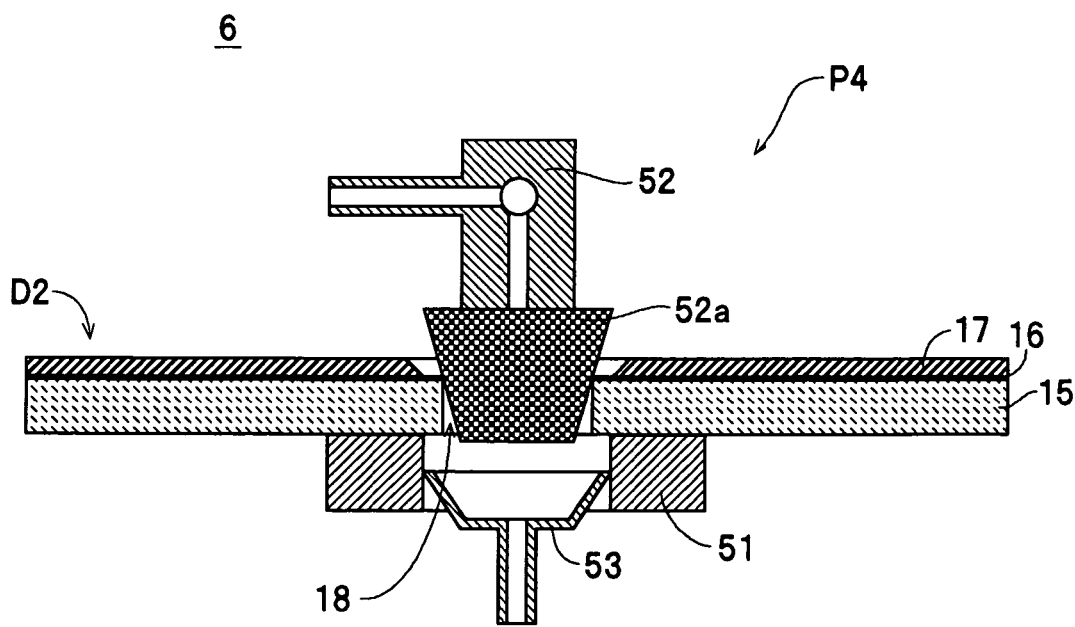
FIG. 18 is a cross-sectional view of the cleaner in a state in which a peripheral surface of a nozzle of the blowing section is brought into abutment with a rim of the central hole by moving the blowing section in the state shown in FIG. 17 further downward.

Next, the control section 10 causes the transfer mechanism 9 to transfer the optical recording medium D2 having the central hole 18 formed therethrough, from the central hole-forming location P3 to the cleaning location P4. At this time, the disk-shaped substrate D1 fed to the feed location P1 by the feed mechanism 2 is transferred from the feed location P1 to the cut-forming location P2 in accordance with rotation of the transfer stage 61, while the disk-shaped substrate D1 having the cut 17a formed by the cut-forming machine 3 is transferred from the cut-forming location P2 to the central hole-forming location P3. In this case, as shown in FIG. 17, the optical recording medium D2 transferred to the cleaning location P4 is placed on the table 51 of the cleaner 6 along with the downward movement of the transfer stage 61. Then, the control section 10 causes the cleaner 6 to clean a portion of the optical recording medium D2 in the vicinity of the central hole 18. More specifically, first, the control section 10 causes the pressure pump to operate to deliver compressed air from the nozzle 52a of the blowing section 52 for blowing, and at the same time causes the suction pump to operate to draw air from the vicinity of the central hole 18 of the optical recording medium D2 via the sucking section 53. Next, the control section 10 causes the vertical movement mechanism 54 to move the blowing section 52 downward. This causes the blowing section 52 to come closer to the optical recording medium D2, so that cuttings generated by punching and adhering to the periphery of the central hole 18 are blown away by the compressed air delivered from the nozzle 52a, and at the same time the cuttings are sucked into the sucking section 53 together with the air drawn from the vicinity of the central hole 18. Further, as shown in FIG. 18, when the blowing section 52 is moved further downward to bring the outer periphery of the nozzle 52a into abutment with the rim of the central hole 18, the control section 10 stops the pressure pump for a predetermined time period. Then, after the lapse of the predetermined time period, the control section 10 causes the pressure pump to operate again, and at the same time causes the vertical movement mechanism 54 to move the blowing section 52 upward. Thus, cleaning of the portion of the optical recording medium D2 in the vicinity of the central hole 18 is completed.

Next, the control section 10 causes the transfer mechanism 9 to transfer the optical recording medium D2 having the central hole 18 cleaned, from the cleaning location P4 to the delivery location P5. At this time, the disk-shaped substrate D1 fed to the feed location P1 by the feed mechanism 2 is transferred from the feed location P1 to the cut-forming location P2 in accordance with rotation of the transfer stage 61, and the disk-shaped substrate D1 having the cut 17a formed by the cut-forming machine 3 is transferred from the cut-forming location P2 to the central hole-forming location P3. Further, the optical recording medium D2 having the central hole 18 formed by the punching machine 4 is transferred from the central hole-forming location P3 to the cleaning location P4 at the same time. Then, the control section 10 causes the delivery mechanism 7 to deliver the optical recording medium D2 transferred to the delivery location P5, to the stack location PE. In doing this, first, the delivery mechanism 7 causes the pivot arm 7b to pivot to the delivery location P5, and move downward, thereafter causing the sucking section 7a to suck the central portion (around the central hole 18) of the front surface of the optical recording medium D2 thereto. Then, the delivery mechanism 7 causes the pivot arm 7b to move upward, pivot to the stack location PE, and move downward, thereafter stopping the sucking section 7a from sucking the optical recording medium D2. Thus, delivery of the optical recording medium D2 is completed.

Thereafter, the control section 10 alternately and repeatedly carries out the operations of feed of a disk-shaped substrate D1 by the feed mechanism 2, formation of a cut 17a by the cut-forming machine 3, formation of a central hole 18 by the punching machine 4, cleaning of a optical recording medium D2 by the cleaner 6, and delivery of the optical recording medium D2 by the delivery mechanism 7, and the operation of transfer (rotation of the transfer stage 61) of disk-shaped substrates D1, D1 . . . , and optical recording media D2, D2 . . . , by the transfer mechanism 9. Further, for example, when there is an optical recording medium D2 transferred to the detecting location P6 by the rotation of the transfer stage 61 without being delivered from the transfer stage 61 owing to insufficient suction or attraction of the optical recording medium D2 by the sucking section 7a, the disk-detecting section 8 delivers the predetermined signal to the control section 10. In this case, the control section 10 executes the stop process for stopping the operations of the feed mechanism 2, the cut-forming machine 3, the punching machine 4, the collector 5, the cleaner 6, the delivery mechanism 7, and the transfer mechanism 9, while causing the display 12 to display an error message to the effect that the optical recording medium D2 has not been delivered, and at the same time causing a loudspeaker, not shown, to produce an alarm sound. This causes the operator to recognize that the optical recording medium D2 has not been delivered, so that the operator removes the optical recording medium D2 from the transfer stage 61 (the detecting location P6). This makes it possible to avoid the inconvenience that a new disk-shaped substrate D1 is fed onto the optical recording medium D2 left undelivered from the transfer stage 61. Further, after the optical recording medium D2 is removed from the transfer stage 61, the operator operates the start button of the operating section 11. In response to this, the control section 10 causes the manufacturing apparatus 1 to resume the process for manufacturing optical recording media D2.

As described heretofore, according to the manufacturing apparatus 1, the control section 10 causes the cut-forming machine 3 to form a cut 17a, then causes the indexing mechanism 62 of the transfer mechanism 9 to rotate the transfer stage 61 to thereby transfer the disk-shaped substrate D1 to the central hole-forming location P3, and then causes the punching machine 4 to punch the central hole 18. Compared with a general transfer mechanism which necessitates long pivot arms, it is possible to reduce the area occupied by the whole manufacturing apparatus 1. Further, according to this manufacturing apparatus 1, differently from the transfer mechanism that transfers a disk-shaped substrate D1 from the cut-forming location P2 to the central hole-forming location, using a pivot arm, it is possible to transfer the disk-shaped substrate only by rotating the transfer stage 61, which makes it possible to perform accurate transfer of the disk-shaped substrate D1 without dropping off the same during the transfer, or setting the disk-shaped substrate in the punching machine 4 in an inclined state.

Also, according to this manufacturing apparatus 1, under the control of the control section 10, the cleaner executes blowing of the compressed air toward the rim of the central hole 18 and suction of air in the vicinity of the rim to thereby perform cleaning of the central hole and it is vicinity, which makes it possible to positively remove cuttings produced during punching of the central hole 18 by the punching machine 4.

Further, according to this manufacturing apparatus 1, due to provision of the transfer mechanism 2 that feeds a disk-shaped substrate D1 onto the transfer stage 61 under the control of the control section 10 and the delivery mechanism 7 that delivers the completed optical recording medium D2 from the transfer stage 61, it is possible to automate a sequence of operations by the manufacturing apparatus 1 from the feed of a disk-shaped substrate D1 to the delivery of a completed optical recording medium D2, to thereby mass-produce the optical recording media D2.

Further, according to this manufacturing apparatus 1, when an optical recording medium D2 is detected at the detecting location P6 by the disk-detecting section 8, the control section 10 executed the predetermined error process (stop process), whereby it is possible to prevent an accident of feeding a new disk-shaped substrate D1 onto the optical recording medium D2 which should have been delivered from the delivery location P5 but remains on the transfer stage 61.

Moreover, according to this manufacturing apparatus 1, the transfer mechanism 9 feeds a disk-shaped substrate D1 from the feed location P1 to the cut-forming location P2, and transfers the optical recording medium D1 for which the formation of the central hole 18 has been completed to the delivery location P5, whereby during formation of the cut 17*a* at the cut-forming location P2, a disk-shaped substrate D1 to be formed with a cut 17*a* next can be fed to the feed location P1 by the feed mechanism 2, and the operations of formation and cleaning of a central hole 18 can be started without waiting for the completed optical recording medium D2 to be delivered by the delivery mechanism 7. This contributes to enhancing manufacturing efficiency of the optical recording media D2.

Also, according to this manufacturing apparatus, the table 21 of the cut-forming machine 3 holds the disk-shaped substrate D1 by sucking the lower surface of the disk-shaped substrate D1, whereby it is possible to positively avoid the inconvenience that the disk-shaped substrate D1 is moved upward by the upward movement of the cut-forming blade section 22.

Further, according to this manufacturing apparatus 1, the substrate-receiving table 36 of the punching machine 4 holds the disk-shaped substrate D1 (optical recording medium D2) by sucking the lower surface thereof, and the ultrasonic horn 37 holds a punched piece CH punched off by the punching blade section 32, whereby it is possible to positively avoid the inconvenience that the optical recording medium D2 is moved upward by the upward movement of the ultrasonic horn 37, so that it is no longer necessary for an operator to manually remove the punched piece CH from the disk-shaped substrate D1, which contributes to further enhanced manufacturing efficiency of the optical recording media D2.

Also, according to this manufacturing apparatus 1, the collector 5 is installed at the central hole-forming location P3, for collecting the punched piece CH held by the ultrasonic horn 37, whereby it is possible to make the manufacturing efficiency of the optical recording media D2 much higher than the case where the sucked punched piece CH is manually removed by the operator.

It should be noted that the present invention is by no means limited to the aforementioned embodiment. For example, although description of the present embodiment has been given on an example of the height of the blade 22*a* of the cut-forming blade section 22 described above is formed to a length (105 μm) slightly larger than the thickness (100 μm) of the light transmission layer 17, this is not limitative, but the blade 22*a* may be formed to have a larger height (e.g. approximately 120 μm) than the above, whereby a cut may be formed in a manner pushing the cutting edge of the blade 22*a* into the substrate 15. This makes it possible to more positively cut through the light transmission layer 17, so that it is possible to positively avoid the inconvenience that a portion of the light transmission layer 17 which is to be punched off together with the associated portion of the substrate remains at the rim of the central hole 18 or its vicinity. Further, although the present embodiment has been described based on an example in which the vertical movement mechanism 63 of the transfer mechanism 9 lifts and lowers the transfer stage 61, and thereby causing the disk-shaped substrate D1 and the optical recording medium D2 to move upward and downward with respect to the cut-forming machine 3 and the punching machine 4, the present invention is by no means limited to this example, but the cut-forming machine 3 and the punching machine 4 may vertically move the disk-shaped substrates D1 placed in the disk-placing recesses 61*a* of the transfer stage 61.

What is claimed is:

1. An optical recording medium-manufacturing apparatus for manufacturing an optical recording medium by forming a central hole that extends through a disk-shaped substrate and a resin layer formed on a first side of the disk-shaped substrate, a second side of the disk-shaped substrate having a recess, the disk-shaped substrate comprising a positioning hole which has a diameter smaller than a diameter of the recess, a center of the positioning hole being aligned with a center of the recess, comprising:

a cut-forming machine installed at a first processing location and comprising a cut-forming blade and a positioning protrusion, the cut-forming blade being configured to cut a circular cut in the resin layer which has a diameter larger than a diameter of the central hole, the positioning protrusion having a truncated conical shape and being configured to fit in the positioning hole of the disk-shaped substrate to position the disk-shape substrate;

a punching machine installed at a second processing location and having comprising a punching blade and a positioning protrusion, the punching blade having a hollow cylindrical shape with a bottom and a diameter slightly smaller than the diameter of the recess, the punching blade being configured to punch the central hole by inserting the punching blade in the recess and punching the punching blade through the second side of the disk-shaped substrate and the resin layer, the positioning protrusion of the punching machine having a truncated conical shape and being configured to fit in the positioning hole of the disk-shaped substrate to position the disk-shaped substrate with respect to the punching blade;

a transfer mechanism comprising a transfer stage, an indexer, and a vertical movement mechanism the transfer mechanism being configured to transfer the disk-shaped substrate from the first processing location to the second processing location, the transfer stage having an overall disk shape and comprising a plurality of disk-placing recesses configured to hold the disk-shaped substrate and located at positions equally distant from a center of the transfer stage and at circumferentially equal intervals, each of the disk-placing recesses comprising a bottom having a working hole configured to allow the cut-forming machine and the punching machine to contact the second side of the disk-shaped substrate when the disk-shaped substrate is placed in a disk-placing recess, the indexer being configured to transfer the disk-shaped substrate from the first processing location to the second processing location when it is placed in a disk-placing recess by rotating the transfer stage, the vertical movement mechanism being configured to move the transfer stage upward and downward; and a controller that controls respective operations of said cut-forming machine, said punching machine, and said transfer mechanism, said controller controlling the vertical movement mechanism to move the transfer stage upward when the disk-shaped substrate is placed on a disk-placing recess, controlling the indexer to move the disk-placing recess on which the disk-shaped substrate is placed to the first processing location, controlling the vertical movement mechanism to move the transfer stage downward to position the disk-shaped substrate such that the positioning protrusion of the cut-forming machine fits into the recess via the working hole of the disk-placing recess, controlling said cut-forming machine to form the cut in the resin layer, controlling the vertical movement mechanism to move the transfer stage upward after the cut-forming machine forms the cut in the resin layer, controlling the indexer to move the disk-placing recess on which the disk-shaped substrate is placed to the second processing location, controlling the vertical movement mechanism to move the transfer stage downward to position the disk-shape substrate such that the positioning protrusion of the punch-forming machine fits into the recess via the working hole of the disk-placing recess, and controlling said punching machine to punch the central hole through the disk-shaped substrate.

2. An optical recording medium-manufacturing apparatus as claimed in claim 1, comprising a cleaner, installed at a third processing location, that cleans the central hole and its vicinity by executing at least one of blowing of a gas toward a rim of the central hole of the disk-shaped substrate for which the formation of the central hole has been completed and suction of air in the vicinity of the rim of the central hole, wherein said controller causes said transfer mechanism to transfer the disk-shaped substrate for which the formation of the central hole has been completed from the second processing location to the third processing location, and causes said cleaner to clean the central hole and its vicinity.

3. An optical recording medium-manufacturing apparatus as claimed in claim 1, comprising a feed mechanism that feeds the disk-shaped substrate to be formed with the cut onto the transfer stage under the control of said controller, and a delivery mechanism that delivers the disk-shaped substrate for which the formation of the central hole has been completed from the transfer stage, under the control of said controller.

4. An optical recording medium-manufacturing apparatus as claimed in claim 1, comprising a substrate detector that detects the disk-shaped substrate transferred over a substrate-detecting location defined between a substrate delivery location from which the disk-shaped substrate for which the formation of the central hole has been completed is delivered from the transfer stage and a substrate feed location from which the disk-shaped substrate to be formed with the central hole is fed onto the transfer stage, wherein said controller executes a predetermined error process when substrate detector detects the disk-shaped substrate.

5. An optical recording medium-manufacturing apparatus as claimed in claim 1, wherein said transfer mechanism is configured to transfer the disk-shaped substrate to be formed with the cut from a substrate feed location from which the substrate is fed onto the transfer stage, to the first processing location, and transfer the disk-shaped substrate for which the formation of the central hole has been completed to a substrate delivery location from which the substrate on the transfer stage is delivered out of the transfer stage.

6. An optical recording medium-manufacturing apparatus as claimed in claim 1, wherein said cut-forming machine comprises a first disk holder that holds the disk-shaped substrate by sucking the second side of the disk-shaped substrate.

7. An optical recording medium-manufacturing apparatus as claimed in claim 1, wherein said punching machine includes a second disk holder that holds the disk-shaped substrate by sucking the second side of the disk-shaped substrate, and a punched piece holder that holds a punched piece punched off by said punching blade.

8. An optical recording medium-manufacturing apparatus as claimed in claim 7, comprising a collector that collects the punched piece held by said punched piece holder.

* * * * *

UNITED STATES PATENT AND TRADEMARK OFFICE
CERTIFICATE OF CORRECTION

PATENT NO. : 7,096,770 B2  
APPLICATION NO. : 10/762305  
DATED : August 29, 2006  
INVENTOR(S) : J. Ide et al.

It is certified that error appears in the above-identified patent and that said Letters Patent is hereby corrected as shown below:

At column 18, line 41 (claim 1, line 17) of the printed patent, "disk-shape" should be --disk-shaped--.

At column 18, line 44 (claim 1, line 20) of the printed patent, before "comprising" delete "having".

At column 18, line 58 (claim 1, line 34) of the printed patent, after "mechanism" insert --,--.

At column 19, line 31 (claim 1, line 74) of the printed patent, "disk-shape" should be --disk-shaped--.

At column 20, line 21 (claim 4, line 11) of the printed patent, after "when" insert --said--.

Signed and Sealed this

First Day of April, 2008

JON W. DUDAS  
*Director of the United States Patent and Trademark Office*